(12) United States Patent
Huang et al.

(10) Patent No.: US 8,300,126 B2
(45) Date of Patent: Oct. 30, 2012

(54) STAGGERED RESET IN CMOS DIGITAL SENSOR DEVICE

(75) Inventors: Ying Huang, Westlake Village, CA (US); Giuseppe Rossi, Los Angeles, CA (US)

(73) Assignee: AltaSens, Inc., Westlake Village, CA (US)

( * ) Notice: Subject to any disclaimer, the term of this patent is extended or adjusted under 35 U.S.C. 154(b) by 859 days.

(21) Appl. No.: 12/335,248

(22) Filed: Dec. 15, 2008

(65) Prior Publication Data
US 2010/0149390 A1 Jun. 17, 2010

(51) Int. Cl.
*H04N 5/335* (2011.01)
(52) U.S. Cl. .......................... 348/294; 348/308
(58) Field of Classification Search .................. 348/294, 348/308, 301, 317, 302; 257/292, 293; 250/208.1, 250/339.02
See application file for complete search history.

(56) References Cited

U.S. PATENT DOCUMENTS

| | | | | |
|---|---|---|---|---|
| 6,529,242 B1* | 3/2003 | Panicacci | | 348/308 |
| 6,583,817 B1* | 6/2003 | Lee | | 348/241 |
| 6,630,957 B1* | 10/2003 | Kuroda et al. | | 348/296 |
| 6,809,766 B1* | 10/2004 | Krymski et al. | | 348/296 |
| 6,867,806 B1* | 3/2005 | Lee et al. | | 348/308 |
| 7,129,985 B1* | 10/2006 | Koizumi et al. | | 348/372 |
| 7,573,516 B2* | 8/2009 | Krymski et al. | | 348/296 |
| 2008/0018559 A1* | 1/2008 | Ochi | | 345/59 |
| 2009/0147120 A1* | 6/2009 | Kurane | | 348/311 |
| 2009/0256938 A1* | 10/2009 | Bechtel et al. | | 348/294 |
| 2011/0109670 A1* | 5/2011 | Sempel et al. | | 345/692 |

* cited by examiner

*Primary Examiner* — Aung S Moe
(74) *Attorney, Agent, or Firm* — Turocy & Watson, LLP

(57) ABSTRACT

Systems and methods are provided that facilitate staggering resets of rows of pixels in a CMOS imaging iSoC sensor. Reset signals and select signals can be provided to pixels in a pixel array in a coordinated manner when employing full frame integration or sub-frame integration. Further, reset signals and select signals can be transferred to a first row of pixels, while reset signals can be transferred to a second row of pixels during a unique readout time interval when utilizing sub-frame integration. Within the unique readout time interval, reset signals can be transferred to the first row of pixels during a first time period, while reset signals can be transferred to the second row of pixels during a second time period, where the first and second time periods are non-overlapping. Accordingly, cross-talk between rows of pixels during reset can be mitigated, which leads to enhanced uniformity.

16 Claims, 11 Drawing Sheets

STAGGERED RESET IN CMOS DIGITAL SENSOR DEVICE

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined voltage level prior to charge transference. A floating diffusion region of a pixel cell is commonly reset by opening a circuit to a reset voltage source. Such opening of the circuit can be managed by digital control.

A typical CMOS sensor records images on a frame by frame basis; the amount of light integrated during a particular frame is linearly dependent on the duration of each frame. Additionally, the duration of each frame is inversely related to the sensor frame rate such that faster frame rates allow less light to be integrated into each pixel. Various light integration modes can be employed by a CMOS imaging sensor. For instance, in full frame integration mode, each pixel can be integrated or exposed to a light source at any times during the duration of a full frame time except when the pixel is being read and reset. This mode can allow for the maximum amount of light to be integrated in each pixel, which can provide high signal integration. Further, in sub-frame integration mode, each pixel can be integrated or exposed to a light source for a period of time which is less than a full frame time while maintaining the same frame rate as for the full frame integration mode. Conventional timing schemes controlling integration time operation within the pixel array, however, can result in non-uniformity in operation associated with these disparate integration modes. More particularly, the non-uniformity can be due to uneven timing schemes of the signals controlling the pixel array between full frame and sub-frame integration mode. For instance, when full frame integration mode is employed only one row of pixels is being reset at any given time, while two or more rows of pixels can concurrently be reset at any time when sub-frame integration mode is utilized. Resetting of two or more rows of pixels at a particular time, for instance, can create cross-talk between the two or more rows being concurrently reset. Cross-talk yielded between rows of pixels can result in undesirable image artifacts.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate staggering resets of rows of pixels in a CMOS imaging iSoC sensor. Reset signals and select signals can be provided to pixels in a pixel array in a coordinated manner when employing full frame integration or sub-frame integration. Further, reset signals and select signals can be transferred to a first row of pixels, while reset signals can be transferred to a second row of pixels during a unique readout time interval when utilizing sub-frame integration. Within the unique readout time interval, reset signals can be transferred to the first row of pixels during a first time period, while reset signals can be transferred to the second row of pixels during a second time period, where the first and second time periods are non-overlapping. Accordingly, cross-talk between rows of pixels during reset can be mitigated, which leads to enhanced uniformity.

According to various aspects, a first select signal can be sent to a first set of pixels in a first row corresponding to a read pointer during a first time period within a unique readout time interval. For instance, the first select signal can be utilized to read respective values from pixels in the first set. Further, a first reset signal can be transferred to the first set of pixels in the first row during a second time period within the unique readout time interval. The first reset signal can be utilized to reset pixels in the first set. Moreover, a second reset signal can be transmitted to a second set of pixels in a second row corresponding to a reset pointer during a third time period within the unique readout time interval. The second reset signal can be employed to reset pixels in the second set. Additionally, a second select signal can be conveyed to the first set of pixels in the first row during a fourth time period within the unique readout time interval. The second select signal can be used to readout respective reset values from pixels in the first set. By way of illustration, the first time period, the second time period, the third time period, and the fourth time period can be mutually exclusive with each other; thus, pixels in the first and second rows can be connected to shared reset buses at disparate times.

The following description and the annexed drawings set forth in detail certain illustrative aspects of the claimed subject matter. These aspects are indicative, however, of but a few of the various ways in which the principles of such matter may

DETAILED DESCRIPTION

Figure 1:
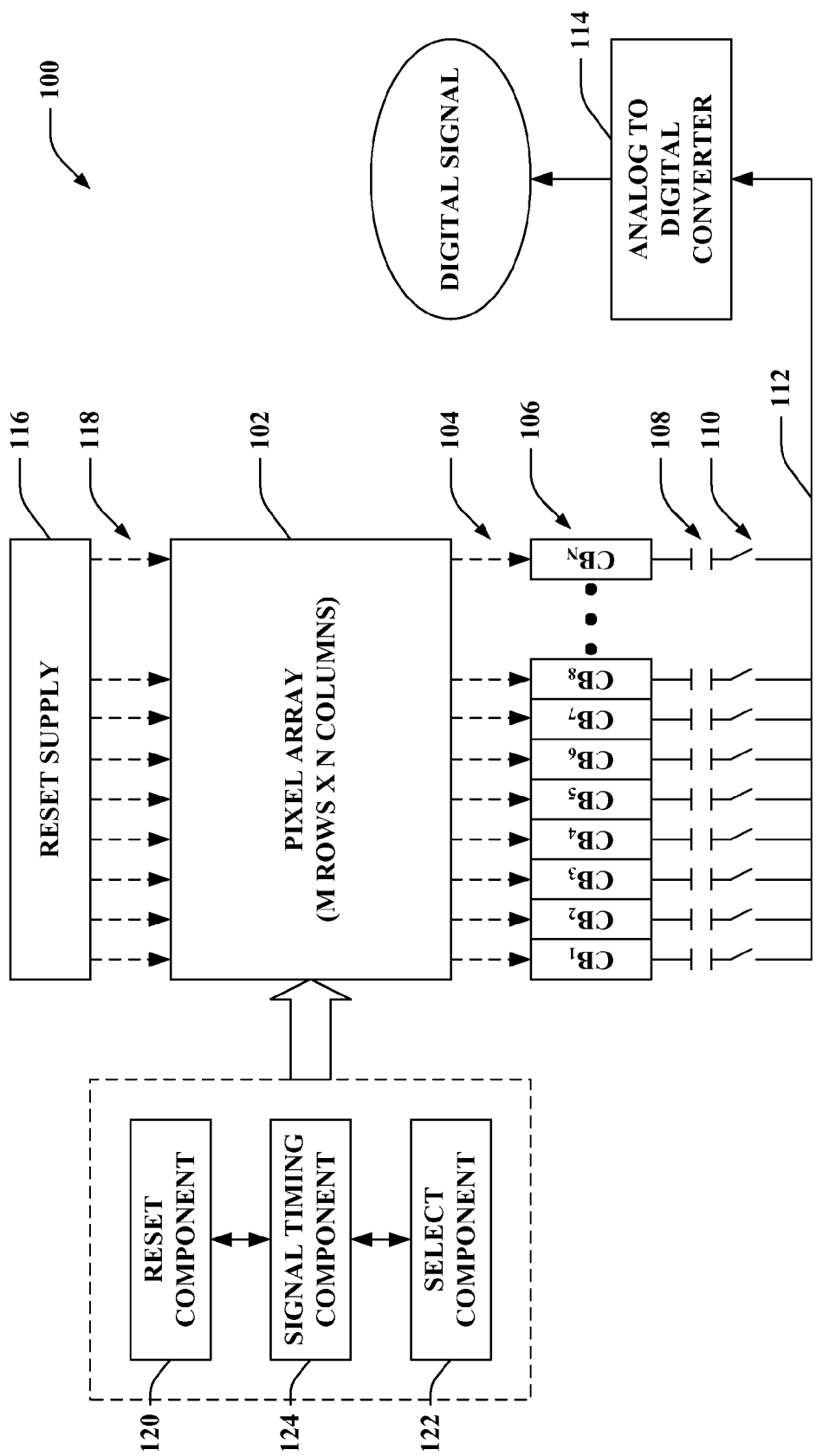
FIG. 1 illustrates a block diagram of an example system that staggers resets of rows of pixels in a CMOS sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that staggers resets of rows of pixels in a CMOS sensor imager. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers. Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). Other color filter patterns are also possible. Additionally, broader light wavelengths beyond the visible spectrum are also possible. It is to be appreciated, however, that the claimed subject matter is not limited to the foregoing.

As an illustration, the following discussion is based on an example pixel as described below in FIG. 3, which includes a transfer gate 304 between a photodiode 302 and a source follower transistor 308. One skilled in the art would appreciate that an appropriate transfer gate signal (TX) can be included into an appropriate timing scheme in accordance with the discussion herein. Moreover, it is contemplated that the below discussion can also be applied to different pixel configurations, which may or may not include the transfer gate transistor 304, or may include additional transfer gate transistors between a floating diffusion node 306 and the source follower gate 308. In general, it should be understood that the following description can be applied to several different pixel configurations and is not limited to the example described in FIG. 3.

Again referring to FIG. 1, an image focused on the pixel array 102 can cause the pixels to convert incident light into electrical energy. Signals obtained by the pixel array 102 can be processed on a column by column basis; thus, a particular row of pixels from the pixel array 102 can be selected to be read. During a readout cycle, each pixel can provide two voltages, and the difference between these two voltages can be measured. The system 100 can further include a plurality of read buses 104 that can transfer the contents from the pixels in the pixel array 102 in the selected row. According to an illustration, the system 100 can include N read buses 104, where each read bus 104 can be associated with a respective column of the pixel array 102. By way of further example, pixels in the pixel array 102 can share read buses 104, and thus, the system 100 can include fewer than N read buses 104. Pursuant to another illustration, each column of the pixel array 102 can be associated with more than one read bus 104; hence, the system 100 can include more than N read buses 104.

Each read bus 104 can carry content (e.g., sampled signals, . . . ) from the pixels to a respective column buffer (CB) 106. The system 100 can include N column buffers 106 or fewer, for instance. The column buffers 106 can amplify (e.g., condition, . . . ) the signals from the pixels. Further, each column buffer 106 can enable low noise readout and can condition the signal from a pixel positioned at one of the rows in the column (or columns) corresponding to the column buffer 106.

After processing by the column buffers 106, outputted values from each of the column buffers 106 can be retained. Moreover, each of the column buffers 106 can be associated with respective circuitry such as, for instance, a respective capacitor 108 and switch 110. Such circuitry can sample and hold outputted values from the corresponding column buffers 106. For example, the capacitors 108 can be loaded with the outputted values from the corresponding column buffers 106. Further, the switches 110 can be closed one at a time to allow for connecting to a bus 112; thus, the voltages generated by the column buffers 106 can be multiplexed over the bus 112. The bus 112 can enable communicating each of the outputted values from the respective column buffers 106 to an analog to digital converter (ADC) 114. The ADC 114 can digitize the sampled signal to yield a digital signal. The digital signal can thereafter be provided to disparate component(s) (not shown) for further processing, manipulation, storage, display, and so forth.

In another example, an amplification block (not shown) can be inserted in the signal path prior to the ADC 114 to provide further signal amplification for optimum noise shaping prior to the digitalization stage. The amplification block can be implemented as a low noise amplifier.

The system 100 can further include a reset supply 116 and a plurality of reset buses 118. The reset supply 116 can provide reset pulses to pixels in the pixel array 102. The reset pulses can enable each of the recipient pixels in the pixel array 102 to be returned to a known state (e.g., a floating diffusion region associated with each pixel can be reset to a predetermined voltage, . . . ). The reset pulses can be delivered to the pixels via the reset buses 118 (e.g., when reset signals are provided to gates of reset transistors included in the pixels, . . . ). It is contemplated that the system 100 can include N reset buses 118 (e.g., each column of pixels in the pixel array 102 can be associated with a corresponding one of the N reset buses 118, . . . ), less than N reset buses 118 (e.g., the reset buses 118 can be shared between two or more columns of pixels in the pixel array 102, . . . ), more than N reset buses 118 (e.g., more than one reset bus 118 can be associated with each column of pixels in the pixel array 102, or a combination thereof.

The system 100 can also include digital controls that can coordinate resetting and reading values from pixels in the pixel array 102. For instance, the system 100 can include a reset component 120, a select component 122 and a signal timing component 124. The reset component 120 can generate, initiate transmission of, send, a combination thereof, etc. reset signal(s) to reset transistor(s) (e.g., gate(s) of the reset transistor(s), . . . ) of pixel(s) included in the pixel array 102 at a given time. For instance, when a reset signal is provided to a reset transistor of a pixel in the pixel array 102, a floating diffusion region of the pixel can be connected to a reset bus 118, which allows a reset pulse from the reset supply 116 to be provided to the floating diffusion region. Further, at times when the reset signal is not supplied to the reset transistor, the pixel can lack a connection between the floating diffusion region and the reset bus 118. Moreover, the select component 122 can yield, instigate conveyance of, transfer, a combination thereof, etc. select signal(s) to select transistor(s) (e.g., gates of the select transistor(s), . . . ) of pixel(s) included in the pixel array 102 at a particular time. For instance, a select signal can initiate readout of a pixel. Further, the signal timing component 124 can control timing of the reset component 120 and/or the select component 122. Thus, the signal timing component 124 can coordinate transferring reset signal(s) and/or select signal(s) to particular pixel(s) in the pixel array 102 at a given time. Although shown as being separate, it is to be appreciated that the signal timing component 124 can include the reset component 120 (or a portion thereof) and/or the select component 122 (or a portion thereof). In another example, pixels belonging to the same physical row of the pixel array 102 can be physically connected to a respective reset component, signal timing component and select component, while pixels belonging to a second physical row of the pixel array 102 can be physically connected to a disparate, respective reset component, signal timing component, and select component. Other arrangements such as connecting pixels belonging to different rows or portions of rows to a respective reset component, signal timing component, and select component are also intended to fall within the scope of the heretoappended claims.

Utilization of the signal timing component 124 can mitigate non-uniformity that results from operation of the system 100 in disparate integration modes (e.g., full frame integration mode, sub-frame integration mode, . . . ). More particularly, the signal timing component 124 can mitigate cross-talk between rows of pixels in the pixel array 102 that can result when employing sub-frame integration mode (e.g., full frame integration mode typically does not yield such cross-talk, . . . ). In contrast, conventional techniques that employ sub-frame integration commonly encounter cross-talk between rows of pixels due to two or more rows being reset during the same time period, where the cross-talk can yield undesirable image artifacts in the outputted, digital signal.

Pixels in the pixel array 102 can be read out after an integration time (e.g., which can be dependent upon the integration mode, . . . ). For instance, one row at a time can be read out (e.g., from bottom to top of the pixel array 102, from top to bottom of the pixel array 102, . . . ). In full frame integration mode, a row of pixels can be sent a select signal and a reset signal during a corresponding, unique readout time interval (e.g., a select signal and a reset signal can be transmitted to a disparate row of pixels during a disparate corresponding, unique readout time interval, . . . ). Further, the signal timing component 124 can control timing associated with when such signals are transferred to each row of pixels in the pixel array 102.

According to another illustration, in sub-frame integration mode, a first row of pixels can be read out during a corresponding, unique readout time interval while a second row of pixels can be reset during the same corresponding, unique readout time interval. The signal timing component 124 can coordinate operation of the reset component 120 and the select component 122 to stagger the resets of pixels in the first row and the second row within the corresponding, unique readout time interval. In contrast, conventional techniques typically reset two rows simultaneously, which causes cross-talk therebetween. Thus, the signal timing component 124 can provide intelligent digital control of the reset process during an image frame process.

Figure 2:
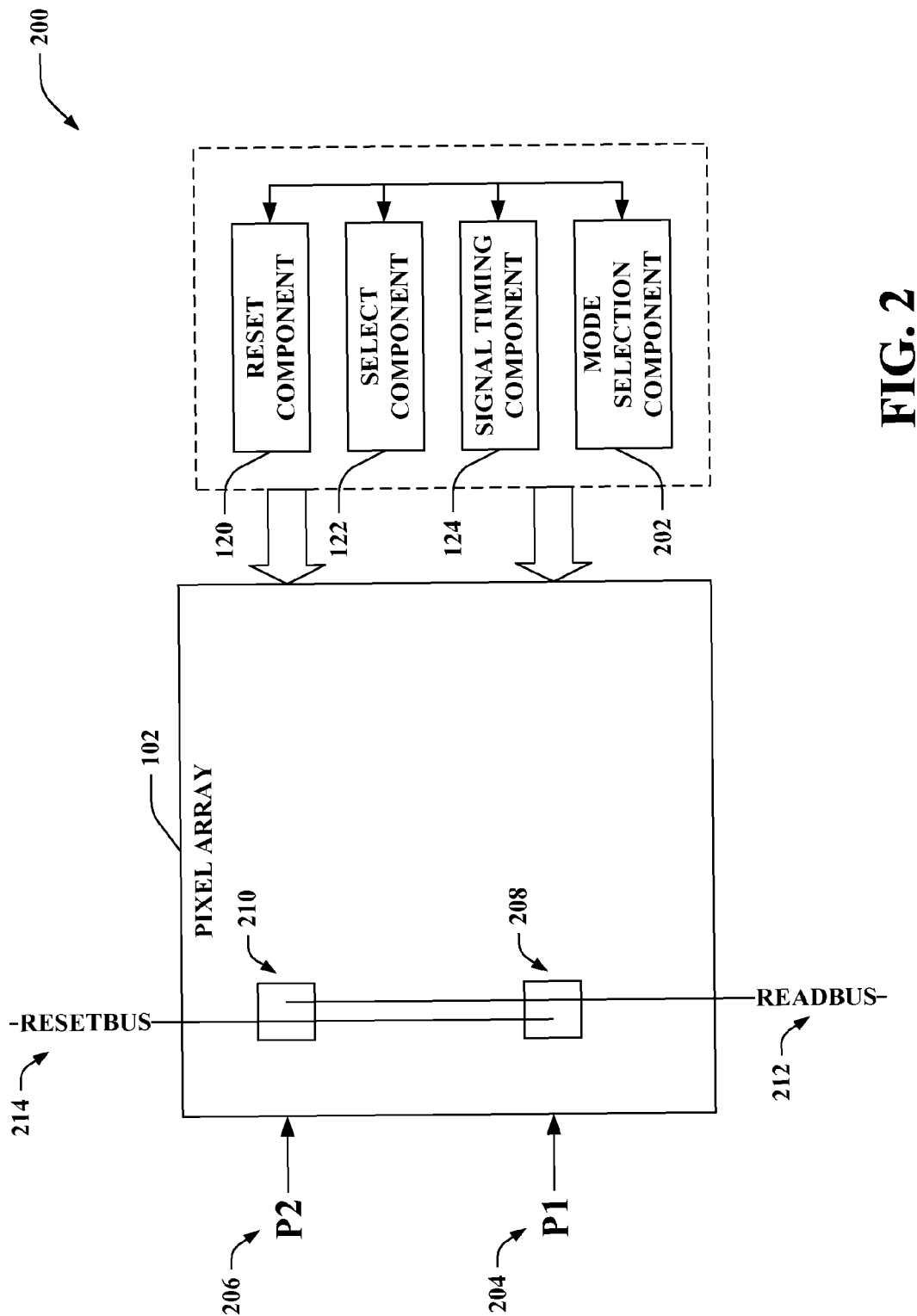
FIG. 2 illustrates an example system that employs staggered reset in a CMOS sensor imager in connection with disparate integration modes.

Referring to FIG. 2, illustrated is an example system 200 that employs staggered reset in a CMOS sensor imager in connection with disparate integration modes. The system 200 includes the pixel array 102, which further comprises a plurality of pixels. Moreover, the reset component 120, the select component 122 and the signal timing component 124 can coordinate timing associated with transferring reset signals and select signals to pixels in the pixel array 102.

The system 200 can further include a mode selection component 202 that can obtain an input related to, effectuate operation utilizing, transition to, a combination thereof, etc. a particular integration mode. According to an example, the mode selection component 202 can receive an input (e.g., via an interface (not shown), from a user, automatically based upon a condition associated with the system 200, . . . ) related to a selection of a particular integration mode from a set of possible integration modes (e.g., the set of possible integration modes can include full frame integration mode, sub-frame integration mode, . . . ). Following this example, the mode selection component 202 can enable employing the selected integration mode. Further, outputs from each of the possible integration modes can exhibit substantially similar fixed pattern noise due to staggering of resets effectuated by the signal timing component 124.

Pursuant to an illustration, full frame integration mode can be utilized by the system 200 (e.g., as chosen, implemented, and so forth with the mode selection component 202, . . . ). When operating in full frame integration mode, each pixel in the pixel array 102 can be integrated or exposed to light at times other than when such pixel is being read out and reset. For instance, full frame integration mode can leverage utilization of one pointer (e.g., P1 204, . . . ). This pointer (e.g., P1 204, can correspond to a given row that is being read out and reset during a unique readout time interval. Thus, the pointer can loop through the pixel array 102 to allow for reading out and resetting disparate rows at disparate, unique readout time intervals (e.g., P1 204 can point to row 100 at a first unique readout time interval, row 101 at a second unique readout time interval, . . . ).

During a given unique readout time interval in full frame integration mode, the signal timing component 124 can coordinate sending a select signal to a particular row corresponding to P1 204 with the select component 122 to enable reading out values obtained by pixels in the particular row. When the select signal is provided to a particular pixel (e.g., a pixel 208 in the particular row corresponding to P1 204, . . . ), a floating diffusion region of that particular pixel can be read out via a corresponding read bus (e.g., a read bus 212, one of the read buses 104 of FIG. 1, . . . ) by allowing charge transfer from the particular pixel. Thereafter, the signal timing component 124 can control the reset component 120 to transfer a reset signal to the particular row corresponding to P1 204. Upon obtaining the reset signal at a reset transistor of the particular pixel (e.g., the pixel 208, . . . ), the floating diffusion region of the particular pixel can be connected to a corresponding reset bus (e.g., the reset bus 214, one of the reset buses 118 of FIG. 1, . . . ). When connected to the reset bus, a reset pulse can be sent to the floating diffusion region of the particular pixel. Moreover, after the particular row of pixels is reset, values stored in the floating diffusion regions can be read out a second time (e.g., to read reset values for each of the pixels in the particular row corresponding to P1 204, . . . ). The signal timing component 124 can control the select component 122 to again transfer the select signal to the particular row corresponding to P1 204. This second readout can be utilized to determine a differential voltage associated with each of the pixels in the particular row. Upon ascertaining the differential voltage, the pointer (e.g., P1 204, . . . ) can be advanced (e.g., to a next row to be read out and reset, . . . ), and so forth.

According to another example, sub-frame integration mode can be implemented by the mode selection component 202. When operating in sub-frame integration mode, two pointers (e.g., P1 204 and P2 206, . . . ) can be employed. P1 204 can be referred to as a read pointer and P2 206 can be referred to as a reset pointer. Thus, P1 204 can correspond to a first row of the pixel array 102 that is being read out and reset during a unique readout time interval, while P2 206 can correspond to a second row of the pixel array 206 that is additionally being reset during this unique readout time interval. An integration time for sub-frame integration mode can be a function of a distance between the two pointers, P1 204 and P2 206. Further, both P1 204 and P2 206 can loop through the pixel array at the same frequency.

During a given unique readout time interval in sub-frame integration mode, the signal timing component 124 can coordinate sending a select signal to the first row corresponding to P1 204 with the select component 122 to enable reading out values obtained by pixels in the first row. For instance, the select signal can be provided to the pixel 208, thereby allowing the floating diffusion region of the pixel 208 to be read out via the read bus 212. Further, the signal timing component 124 can control the reset component 120 to send a reset signal to the first row corresponding to P1 204. Upon obtaining the reset signal at the reset transistor of the pixel 208, for example, the floating diffusion region of this pixel 208 can be connected to the reset bus 214 to cause the floating diffusion region to return to a reset value. Further, the signal timing component 124 can again control the select component to transfer the select signal to the first row corresponding to P1 204 to allow for determining differential voltages from pixels in the first row. During a disparate time period within the given unique readout time interval (e.g., as compared to when the reset signal is provided to the first row corresponding to P1 204, . . . ), the signal timing component 124 can manage the reset component 120 to transfer a reset signal to the second row corresponding to P2 206. By way of illustration, a pixel 210 in the second row can obtain the reset signal at a reset transistor included therein, and the reset signal can cause a floating diffusion region of the pixel 210 to be connected to the reset bus 214. When connected to the reset bus 214, a reset pulse can be sent to the floating diffusion region of the pixel 210. The signal timing component 124 can stagger providing reset signals to the first row and the second row, thus mitigating differences in overlay of fixed pattern noise that can result from two pixels simultaneously accessing a common reset bus (e.g., the reset bus 214, . . . ). Further, the pointers can be advanced within the pixel array 102, and so forth.

When operating in sub-frame integration mode, the signal timing component 124 can allow for staggering resets of pixels in the first row (e.g., corresponding to P1 204, . . . ) and the second row (e.g., corresponding to P2 206, in any manner. By way of illustration, the pixels in the second row corresponding to P2 206 can be reset first, and thereafter a cycle of reading, resetting, and reading out the reset values of the pixels in the first row corresponding to P1 204 can be effectuated as managed by the signal timing component 124. Pursuant to a further example, the first row corresponding to P1 204 can be read and reset, followed by resetting the second row corresponding to P2 206, and thereafter the reset values of pixels in the first row corresponding to P1 204 can be read out. It is to be appreciated, however, that the claimed subject matter is not limited to the aforementioned examples of possible staggered resets.

Figure 3:
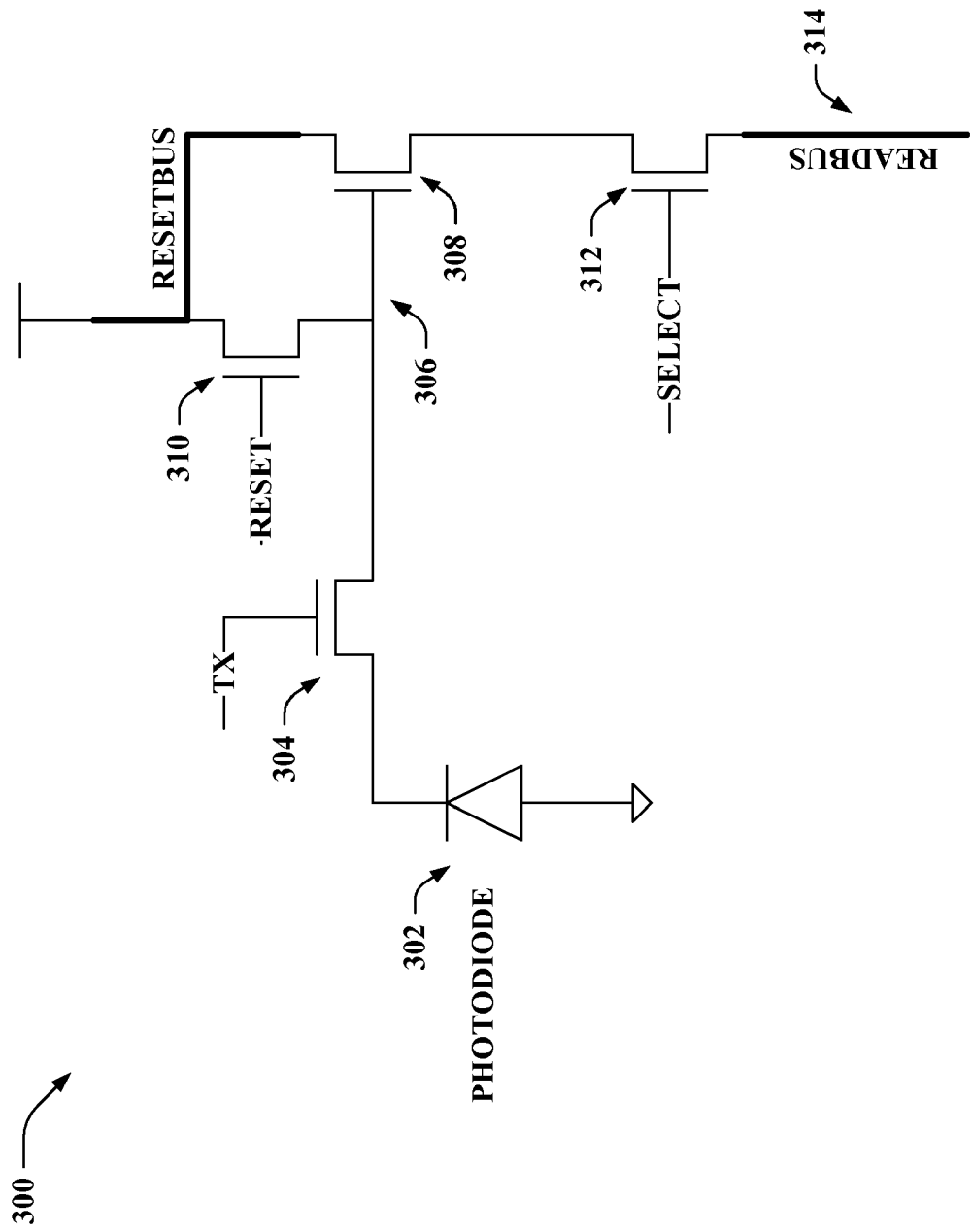
FIG. 3 illustrates an example CMOS imager pixel cell that can be included in a pixel array.

Now turning to FIG. 3, illustrated is an example CMOS imager pixel cell 300 that can be included in a pixel array (e.g., the pixel array 102 of FIG. 1). The pixel cell 300 can be a 4T pixel cell utilized in a CMOS iSoC. The pixel cell 300 includes a photodiode 302 connected to a transfer transistor 304. The transfer transistor 304 is further connected to a floating diffusion region 306. The floating diffusion region 306 connects to a source follower transistor 308 and a reset transistor 310. The source follower transistor 308 is further connected to a select transistor 312. The select transistor 312 can be employed to select a particular row of pixel cells from a pixel array. For instance, a select signal (e.g., yielded by the select component 122 of FIG. 1, ... ) can be received at a gate of the select transistor 312 to read out a value from the floating diffusion region 306.

The photodiode 302 can be charged by converting optical energy to electrical energy. For instance, the photodiode 302 can have sensitivity to a particular type of incident light (e.g., red light, blue light, green light). Moreover, the type of light to which the photodiode 302 is sensitive can indicate a type of the pixel cell 300 (e.g., R pixel, B pixel, G pixel).

According to an illustration, the floating diffusion region 306 can be reset to a known state before transfer of charge to it. Resetting of the floating diffusion region 306 can be effectuated by the reset transistor 310. For example, a reset signal (e.g., from the reset component 120 of FIG. 1, ... ) can be received at a gate of the reset transistor 310 to cause resetting of the floating diffusion region 306. Further, the transfer transistor 304 can transfer charge (e.g., yielded by the photodiode 302) to the floating diffusion region 306. The charge can be transferred based upon a transfer signal (TX) received at a gate of the transfer transistor 304. Light can be integrated at the photodiode 302 and electrons generated from the light can be transferred to the floating diffusion region 306 (e.g., in a noiseless or substantially noiseless manner) when the TX is received at the transfer transistor 304. Moreover, the pixel cell 300 (along with other pixel cell(s) in the same row of the pixel array) can be selected for readout by employing the select transistor 312. Readout can be effectuated via a read bus 314 (e.g., one of the read buses 104 of FIG. 1). Further, the source follower transistor 308 can output and/or amplify a signal representing a reset voltage (e.g., provided via a reset bus) and a pixel signal voltage based on the photo converted charges.

The CMOS imager pixel cell 300 can be in a first row of pixels that is read and reset or in a second row of pixels that is reset only when sub-frame integration is implemented. When the CMOS imager pixel cell 300 is in the first row that is read and reset, a select signal can be received at the select transistor 312 to effectuate reading out the pixel signal voltage, a reset signal can be obtained at the reset transistor 310 to reset the floating diffusion region 306, and the reset voltage at the floating diffusion region 306 can be read out by receiving another select signal at the select transistor 312. Further, when the CMOS imager pixel cell 300 is in the second row that is reset without being read out, a reset signal can be obtained at the reset transistor 310 to reset the floating diffusion region 306. As described herein, resetting of pixels in the first row and the second row can be staggered during a given unique readout time interval to mitigate cross-talk therebetween.

Figure 4:
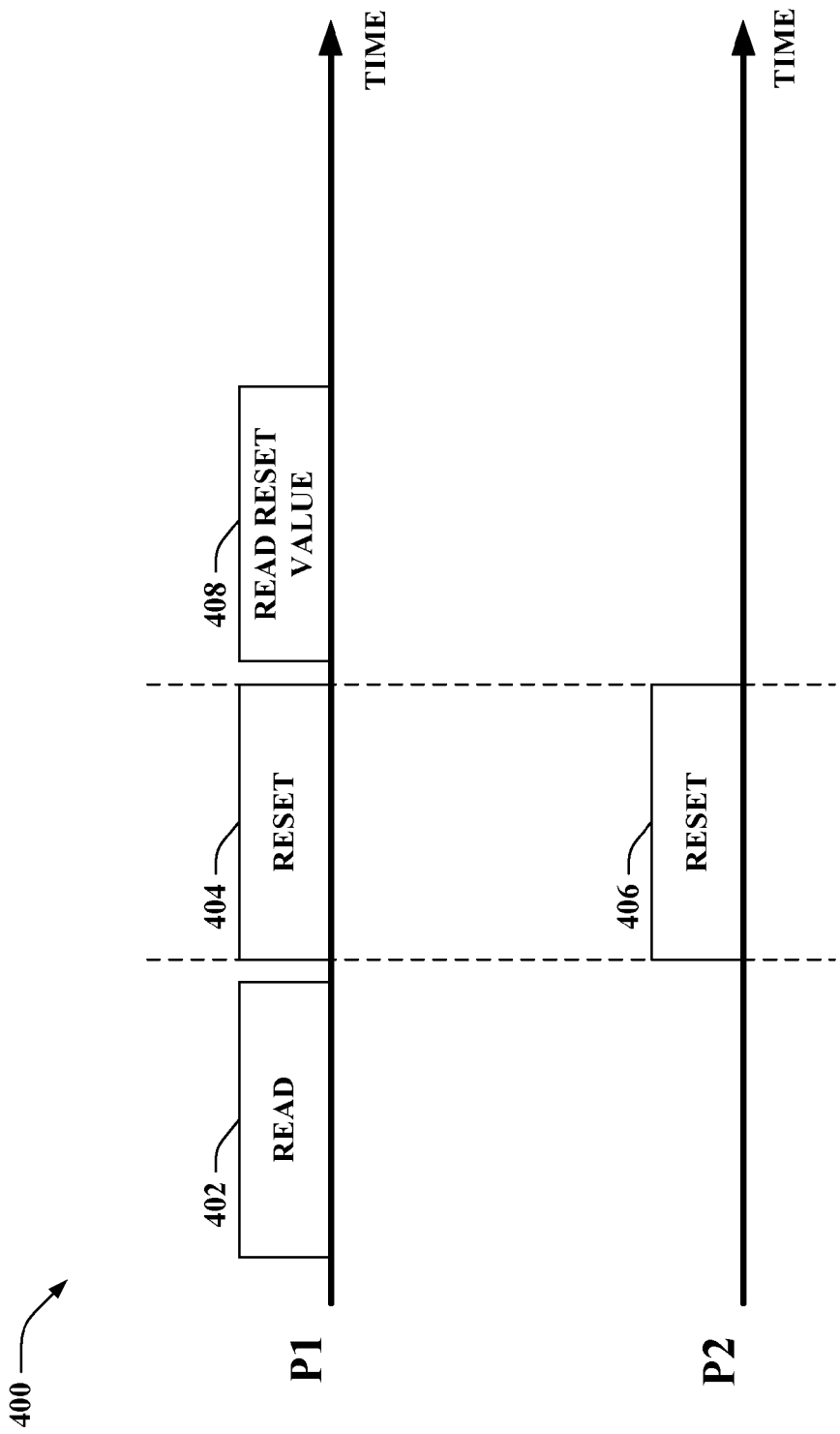
FIGS. 4-6 illustrate example sub-frame integration timing diagrams for CMOS sensor devices in accordance with various aspects of the claimed subject matter.
Figure 5:
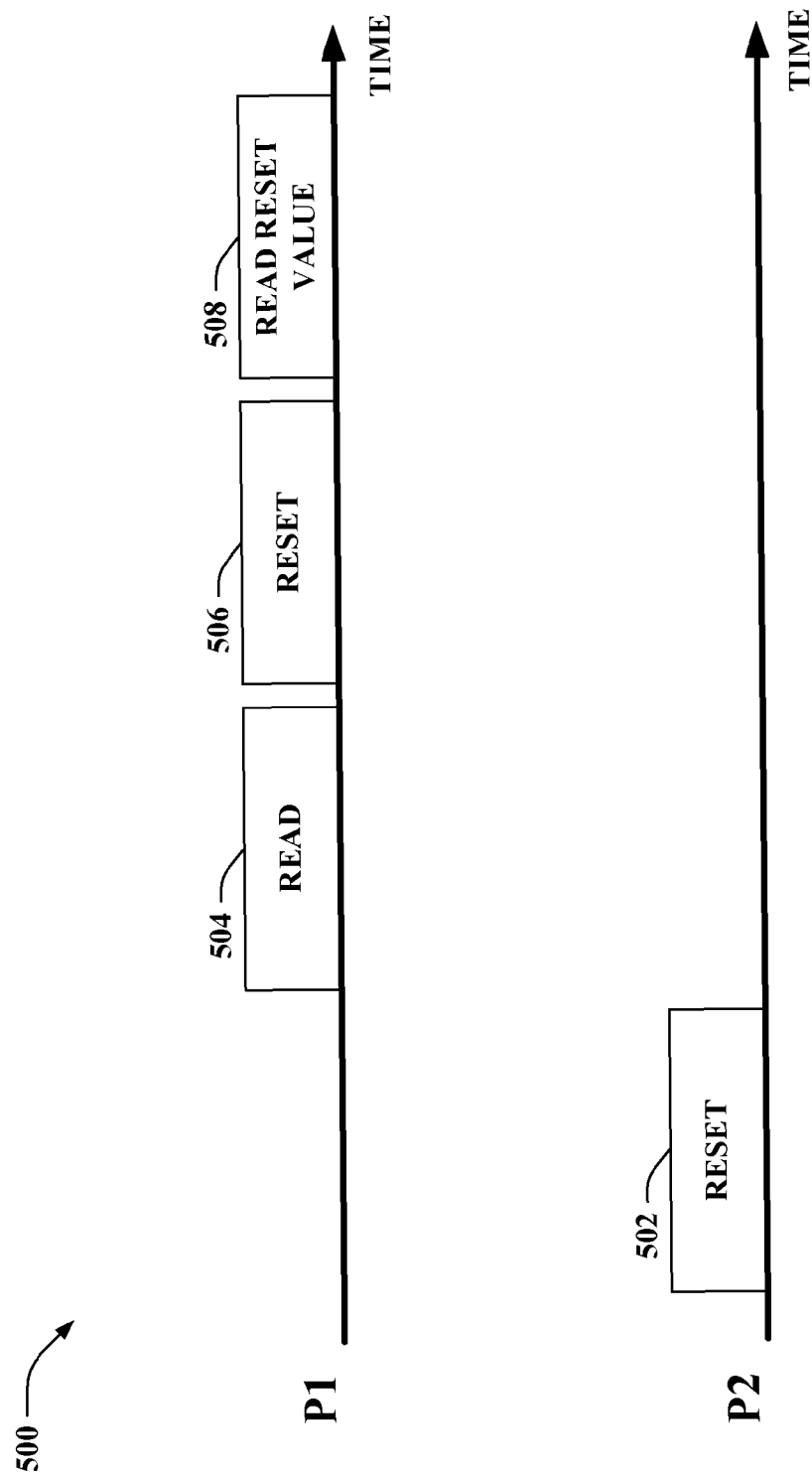
Figure 6:
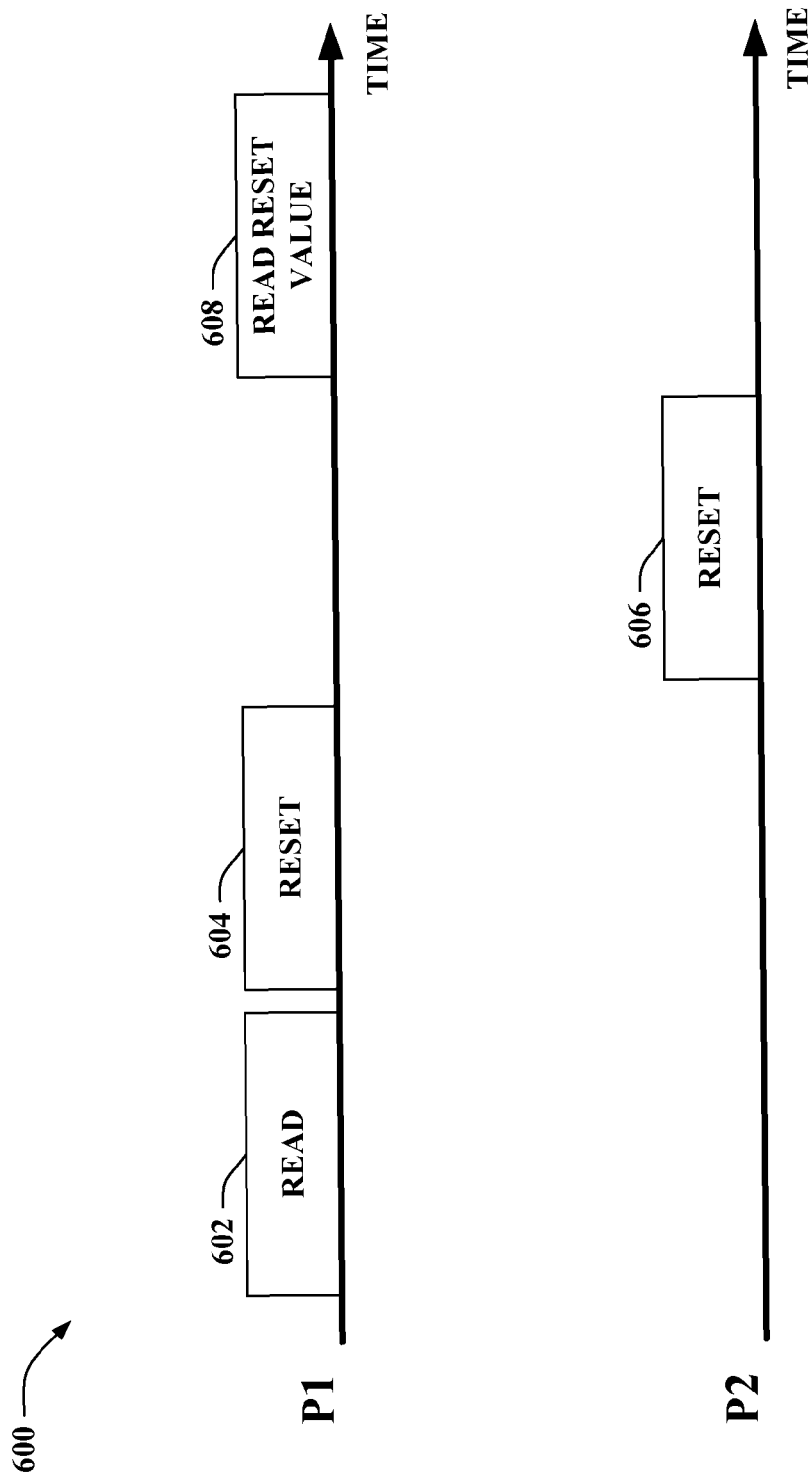

Referring to FIGS. 4-6, illustrated are example sub-frame integration timing diagrams for CMOS sensor devices in accordance with various aspects of the claimed subject matter. FIGS. 4-6 show the timing of resets corresponding to two pointers (e.g., P1 and P2, read pointer and reset pointer, ... ) as well as reads corresponding to one of these two pointers (e.g., P1, read pointer, ... ); thus, FIGS. 4-6 can each depict a readout time interval during which various actions can be performed (e.g., as controlled by the signal timing component 124 of FIG. 1, ... ). It is to be appreciated that the example timing diagrams depict illustrations of possible reset techniques that can be employed. It is contemplated, however, that other reset techniques other than the illustrated examples are intended to fall within the scope of the heretoappended claims.

Turning to FIG. 4, illustrated is an example sub-frame integration timing diagram 400 with overlapping resets. For instance, the timing diagram 400 can be employed in connection with conventional techniques. As shown, during a readout time interval, pixel(s) corresponding to P1 can be read at 402. Thereafter, pixel(s) corresponding to P1 can be reset at 404, while pixel(s) corresponding to P2 can simultaneously be reset at 406. Then, at 408, reset value(s) of pixel(s) corresponding to P1 can be read. Overlap in resets for P1 and P2 at 404 and 406 can yield differing fixed pattern noise as compared to a scenario where full frame integration is utilized. Thus, to mitigate for such impact, staggered resets of pixels corresponding to P1 and P2 can be leveraged as described in connection with FIGS. 5-6.

Referring to FIG. 5, illustrated is an example sub-frame integration timing diagram 500 with staggered resets. The timing diagram 500 shows a first stagger mode that can be utilized by a CMOS sensor imager. A readout time interval can begin with pixel(s) corresponding to P2 being reset at 502. Thereafter, pixel(s) corresponding to P1 can be read at 504, followed by pixel(s) corresponding to P1 being reset at 506, and reset value(s) of pixel(s) corresponding to P1 being read at 508. As illustrated in the timing diagram 500, P1 and P2 can be reset during different time periods within a common readout time interval. Accordingly, since one pixel can be accessing each reset bus at a given time, sub-frame integration and full frame integration can exhibit similar fixed pattern noise.

Now turning to FIG. 6, illustrated is another example sub-frame integration timing diagram 600 that leverages staggered resets. The timing diagram shows a second stagger mode that can be employed by a CMOS sensor imager. A readout time interval can begin with pixel(s) corresponding to P1 being read at 602, followed by pixel(s) corresponding to P1 being reset at 604. Thereafter, pixel(s) corresponding to P2 can be reset at 606. Reset value(s) of pixel(s) corresponding to P1 can then be read at 608. Similar to the timing diagram 500 of FIG. 5, the timing diagram 600 also allows P1 and P2 to be reset during disparate time periods within the readout time interval, thus promoting uniformity between sub-frame integration or full frame integration. It is to be appreciated, however, that the claimed subject matter is not limited to these examples of staggered resets; rather, any staggered reset pattern that allows for non-coinciding resets can be leveraged.

Further, although not shown, multiple reset pointers (e.g., a plurality of pointers similar to P2, ... ) can be generated and staggered in the pixel array with a single read pointer (e.g., P1, ... ), or alternative combinations of read pointers (e.g., pointers similar to P1, ... ) and reset pointers (e.g., pointers similar to P2s, ... ) can be utilized. Accordingly, each of these pointers can be reset during non-overlapping time periods within a common readout time interval.

Figure 7:
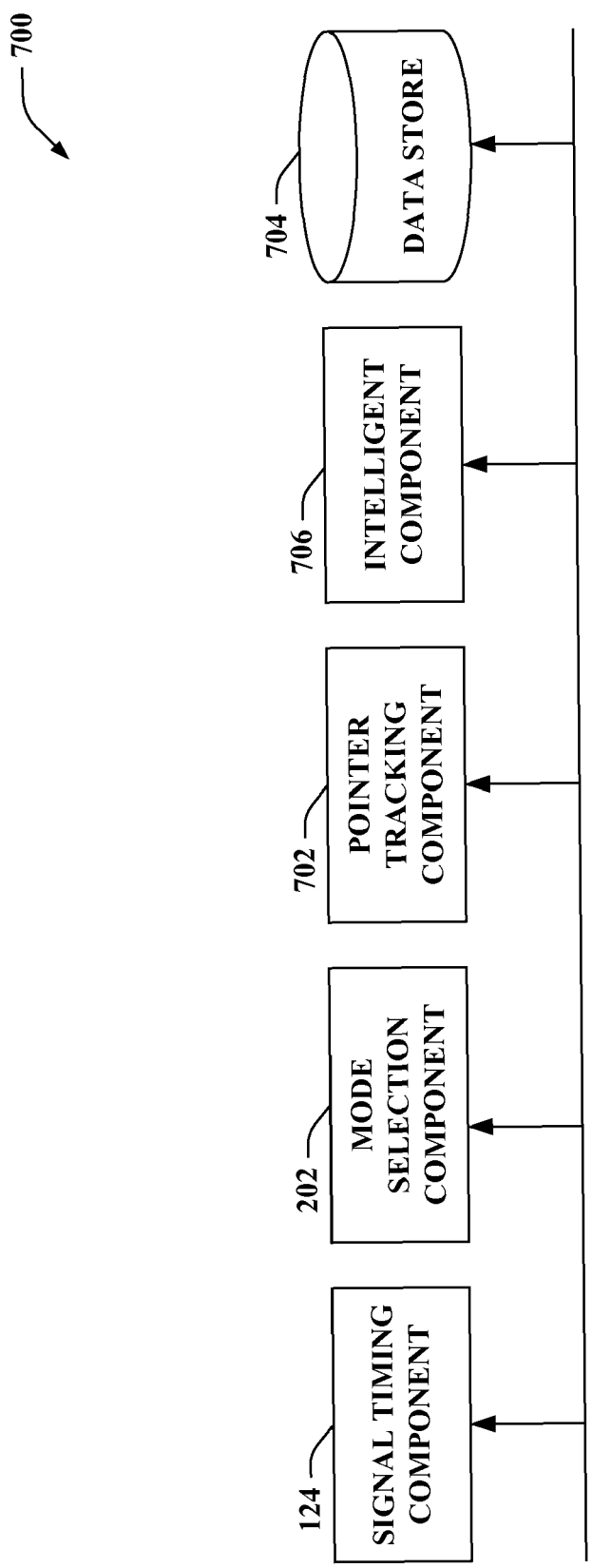
FIG. 7 illustrates an example system that coordinates resets of pixels in a CMOS sensor imager.

With reference to FIG. 7, illustrated is a system 700 that coordinates resets of pixels in a CMOS sensor imager. The system 700 includes the signal timing component 124 that controls providing select signal(s) and reset signal(s) to pixel(s) in a pixel array and the mode selection component 202 that enables transitioning between disparate integration modes (e.g., full frame integration mode, sub-frame integration mode, ... ), each of which can be substantially similar to the aforementioned descriptions. Moreover, the system 700 can include a pointer tracking component 702, a data store 704, and an intelligent component 706.

The pointer tracking component 702 can identify value(s) (e.g., row(s) of the pixel array, . . . ) for one or more pointers. For instance, the pointer tracking component 702 can follow one pointer when full frame integration mode is employed, while the pointer tracking component 702 can follow two pointers (e.g., read pointer and reset pointer, . . . ) when sub-frame integration mode is utilized. Moreover, the pointer tracking component 702 can advance, loop, etc. the pointer(s) as a function of time. Further, the pointer tracking component 702 can control an integration time when sub-frame integration mode is employed by selecting a distance between the read pointer and the reset pointer (e.g., number of rows between rows respectively corresponding to these pointers, . . . ).

The pointer tracking component 702, for instance, can retain the value(s) for the one or more pointers in the data store 704. Moreover, instructions utilized by the signal timing component 124, the mode selection component 202, and/or the pointer tracking component 702 can be retained in and retrieved from the data store 704. The data store 704 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 704 of the subject systems and methods is intended to comprise, without being limited to, these and any other suitable types of memory. In addition, it is to be appreciated that the data store 704 can be a server, a database, a hard drive, and the like.

The intelligent component 706 can be employed by the signal timing component 124, the mode selection component 202, and/or the pointer tracking component 702. For instance, the signal timing component 124 can leverage the intelligent component 706 to perform reasoning in connection with selecting an optimal stagger mode from a set of potential stagger modes while in a sub-frame integration mode. By way of another illustration, the mode selection component 202 can leverage the intelligent component 706 to infer an optimal integration mode from a set of potential integration modes to be employed by the CMOS sensor imager.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
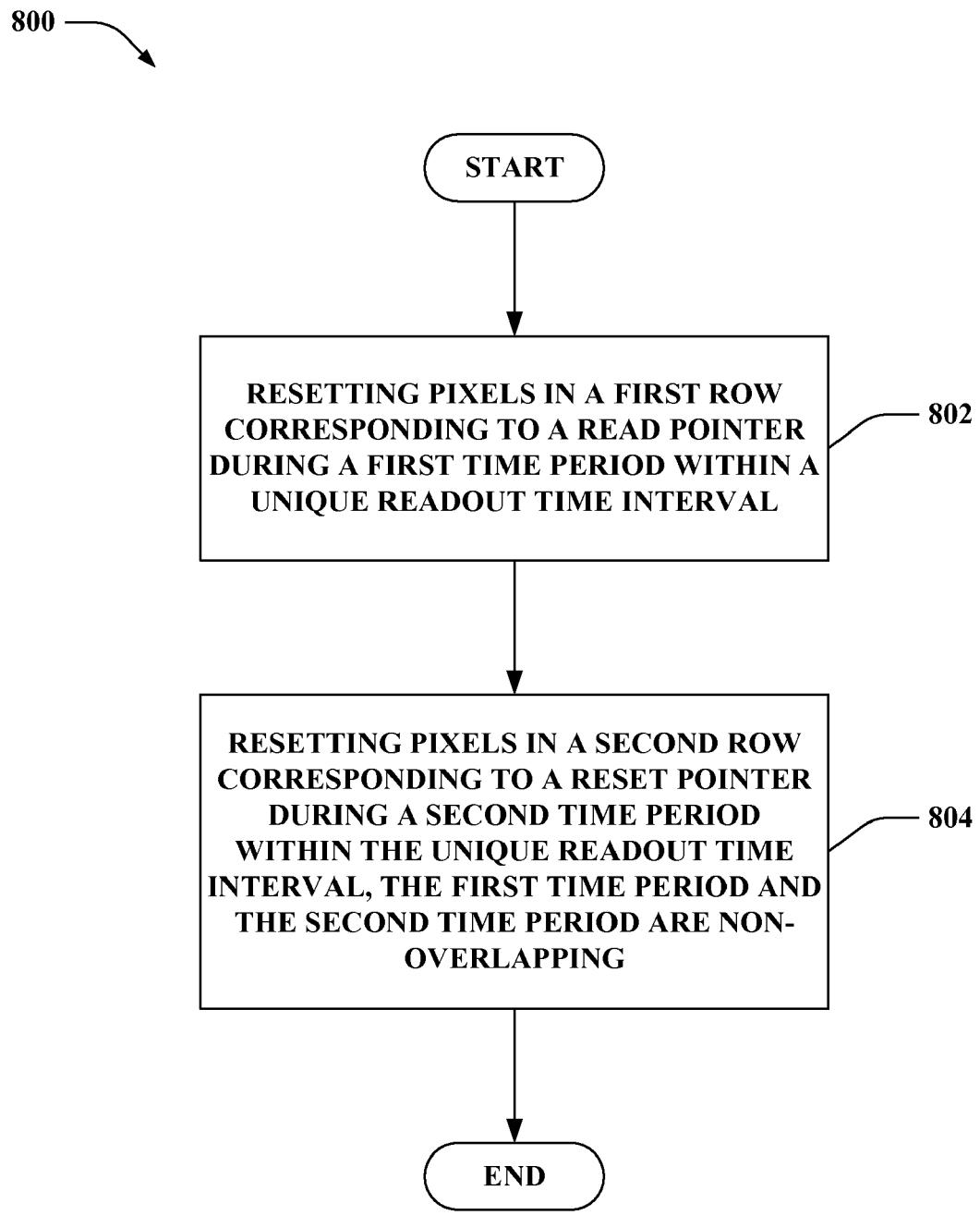
FIG. 8 illustrates an example methodology that facilitates staggering resets in a CMOS sensor imager.
Figure 9:
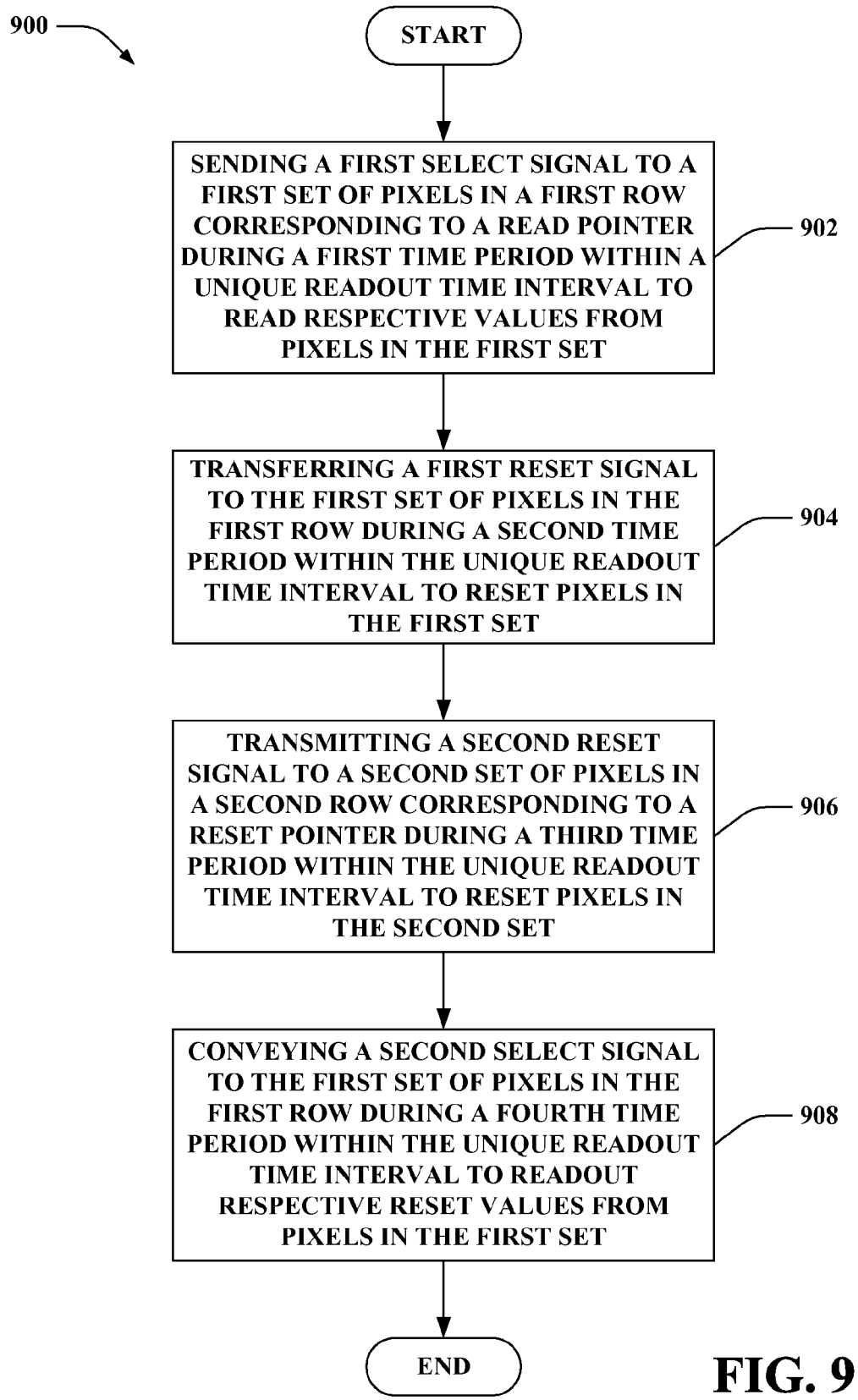
FIG. 9 illustrates an example methodology that facilitates staggering resets for sub-frame integration in a CMOS sensor imager.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates staggering resets in a CMOS sensor imager. At 802, pixels in a first row corresponding to a read pointer can be reset during a first time period within a unique readout time interval. The read pointer identifies the first row of pixels from a pixel array during the unique readout time interval as being pixels to be read out and reset. The pixels in the first row can be reset by providing a reset signal to gates of reset transistors included in each of the pixels. Upon supplying the reset signal, a reset bus can be connected to a floating diffusion region of each of the pixels to allow for resetting the floating diffusion region to a predetermined voltage. At 804, pixels in a second row corresponding to a reset pointer can be reset during a second time period within the unique readout time interval. For instance, the first time period and the second time period can be non-overlapping. It is to be appreciated that the first time period can be before or after the second time period. The reset pointer identifies the second row of pixels from the pixel array during the unique readout time interval as being pixels to be reset. Further, the pixels in the second row can be reset by supplying a reset signal to gates of reset transistors included in each of the pixels, thereby connecting a reset bus to a floating diffusion region of each of the pixels to enable resetting the floating diffusion region to the predetermined voltage. The read pointer and the reset pointer identify the first row and the second row, respectively, during the unique readout time interval, and these pointers can be advanced to identify differing respective rows during a next unique readout time interval. Moreover, the read pointer and the reset pointer can be employed when operating in a sub-frame integration mode, while the read pointer can be utilized without the reset pointer in full frame integration mode.

According to another example, a disparate reset pointer (e.g., second reset pointer, . . . ) can be utilized. Following this example, pixels in a third row corresponding to the disparate reset pointer can be reset during a third time period within the unique readout time interval. Further, the first time period, the second time period, and the third time period can be non-overlapping. Moreover, it is to be appreciated that any number of additional reset pointers can be employed. However, the claimed subject matter is not limited to this example.

Now turning to FIG. 9, illustrated is a methodology 900 that facilitates staggering resets for sub-frame integration in a CMOS sensor imager. At 902, a first select signal can be sent to a first set of pixels in a first row corresponding to a read pointer during a first time period within a unique readout time interval to read respective values from pixels in the first set. For instance, the first select signal can be sent to gates of select transistors included in pixels from the first set. At 904, a first reset signal can be transferred to the first set of pixels in the first row during a second time period within the unique readout time interval to reset pixels in the first set. At 906, a second reset signal can be transmitted to a second set of pixels in a second row corresponding to a reset pointer during a third time period within the unique readout time interval to reset pixels in the second set. It is to be appreciated, however, that the second reset signal need not be transmitted when full frame integration mode is employed by the CMOS sensor imager. At 908, a second select signal can be conveyed to the first set of pixels in the first row during a fourth time period within the unique readout time interval to readout respective reset values from pixels in the first set. It is to be appreciated that the first, second, third, and fourth time periods can be non-overlapping with each other. Moreover, according to an illustration, the ordering of the time periods within the unique readout time interval can start with the first time period, followed by the second time period, then the third time period, and thereafter the fourth time period. By way of another illustration, the ordering of time periods within the unique readout time interval can start with the third time period (e.g., reset the second set of pixels, . . . ), followed by the first time period (e.g., read the first set of pixels, . . . ), then the second time period (e.g., reset the first set of pixels, . . . ), and thereafter the fourth time period (e.g., readout the reset values from the first set of pixels, . . . ).

Figure 10:
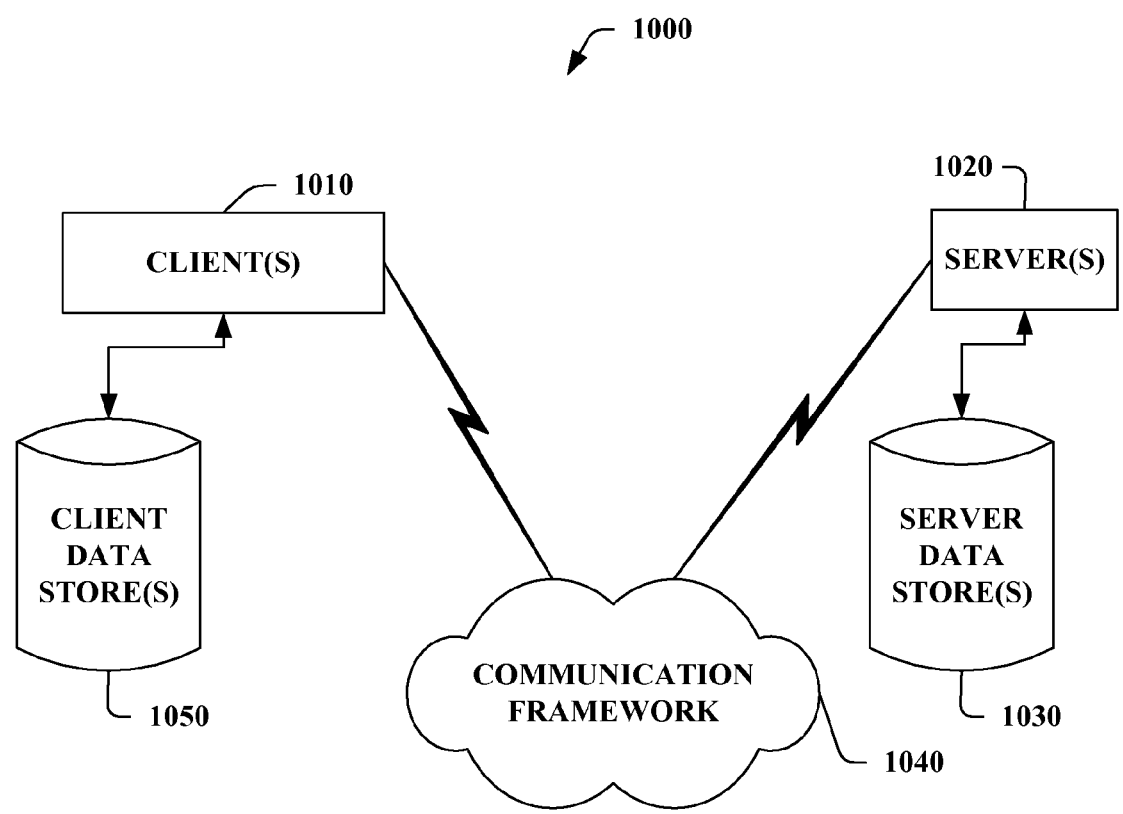
FIG. 10 illustrates an example networking environment, wherein the novel aspects of the claimed subject matter can be employed.
Figure 11:
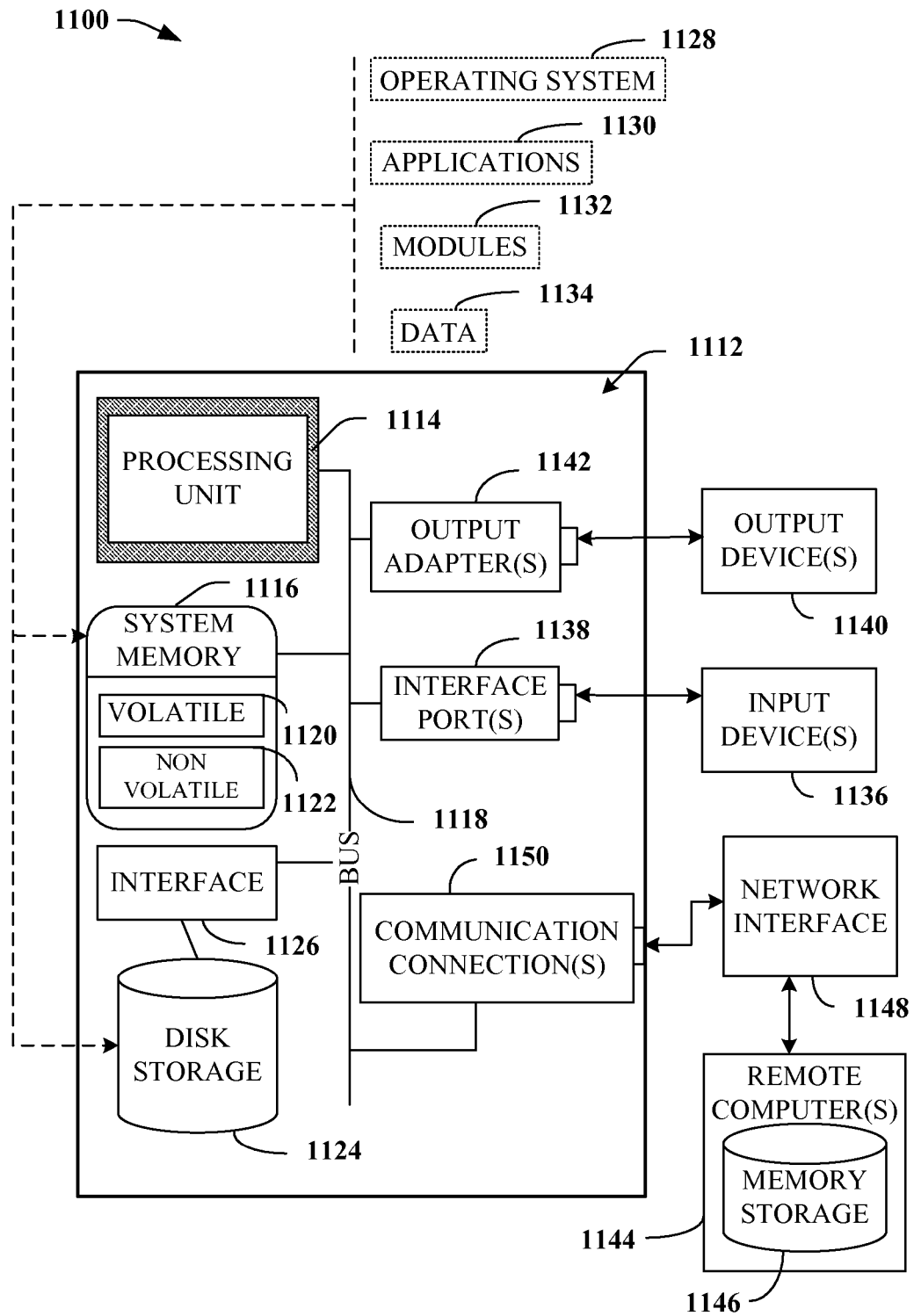
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with staggering resets for sub-frame integration mode within CMOS sensor imagers. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that staggers resets of rows of pixels in a complementary metal-oxide-semiconductor (CMOS) imaging system-on-chip (iSoC) sensor, comprising:
   a reset component that sends reset signals to reset transistors of pixels included in a pixel array to reset the pixels;
   a select component that transfers select signals to select transistors of the pixels included in the pixel array to readout values from the pixels; and
   a signal timing component that controls timing of the reset component and the select component to coordinate transferring reset signals and select signals to the pixels, wherein when employing sub-frame integration, a first select signal is transferred at a first time period, a first reset signal is transferred at a second time period, a second select signal is transferred at a third time period, and a second reset signal is sent at a fourth time period, such that disparate rows of pixels in the pixel array are reset at different, non-intersecting time periods during a unique readout time interval, wherein the unique readout time is not longer than a time needed to integrate one frame and the first time period, the second time period, the third time period and the fourth time period are non-overlapping.

2. The system of claim 1, the reset component sends the reset signals to the reset transistors to connect floating diffusion regions of the pixels to respective reset buses, which supply reset pulses to the floating diffusion regions.

3. The system of claim 1, the signal timing component mitigates cross-talk between rows of pixels in the pixel array when employing sub-frame integration mode.

4. The system of claim 1, the signal timing component manages the reset component and the select component to send the reset signals and the select signals to pixels in a first row of the pixel array during a first unique readout time interval and a second row of the pixel array during a second unique readout time interval when employing full frame integration.

5. The system of claim 1, the signal timing component controls the reset component to transfer the reset signals to pixels in a first row of the pixel array and pixels in a second row of the pixel array during different, non-intersecting time periods within the unique readout time interval when utilizing sub-frame integration.

6. The system of claim 5, the signal timing component further controls the select component to transmit the select signals to pixels in the first row of the pixel array during the unique readout time interval.

7. The system of claim 1, further comprising a mode selection component that obtains an input related to a chosen integration mode from a set of possible integration modes and effectuates operation utilizing the chosen integration mode, outputs from each of the possible integration modes exhibit substantially similar fixed pattern noise.

8. The system of claim 1, further comprising a pointer tracking component that identifies a row corresponding to a read pointer during a unique readout time interval for full frame integration and identifies a first row corresponding to a read pointer and a second row corresponding to a reset pointer during the unique readout time interval for sub-frame integration.

9. The system of claim 8, the read pointer indicates pixels to be read out and reset during the unique readout time interval and the reset pointer indicates pixels to be reset during the unique readout time interval.

10. The system of claim 1, the signal timing component coordinates sending a first reset signal to pixels in a first row corresponding to a read pointer during a first time period within a unique readout time interval and sending a second reset signal to pixels in a second row corresponding to a reset pointer during a second time period within the unique readout time interval while operating in sub-frame integration mode, the first time period and the second time period are non-overlapping to stagger the first reset signal and the second reset signal.

11. The system of claim 1, the signal timing component staggers resetting pixels in a first row corresponding to a read pointer and pixels in a second row corresponding to a reset pointer.

12. A system that staggers resets of rows of pixels in a CMOS imaging system-on-chip (iSoC) sensor, comprising:
a reset component that sends reset signals to reset transistors of pixels included in a pixel array to reset the pixels;
a select component that transfers select signals to select transistors of the pixels included in the pixel array to readout values from the pixels; and
a signal timing component that controls timing of the reset component and the select component to coordinate transferring reset signals and select signals to the pixels, wherein the signal timing component coordinates:
transmitting a first select signal to pixels in the first row during a time period prior to sending a first reset signal to pixels in a first row corresponding to a read pointer during a first time period within a unique readout time interval;
transmitting a second select signal to pixels in the first row during a time period subsequent to sending the first reset signal; and
sending a second reset signal to pixels in a second row corresponding to a reset pointer during a second time period within the unique readout time interval while operating in sub-frame integration mode, wherein the first time period and the second time period are non-overlapping to stagger the first reset signal and the second reset signal and the first select signal initiates reading values from pixels in the first row and the second select signal causes reading of reset values from pixels in the first row.

13. A method that facilitates staggering resets for sub-frame integration in a CMOS sensor imager, comprising:
sending a first select signal to a first set of pixels in a first row corresponding to a read pointer during a first time period within a unique readout time interval to read respective values from pixels in the first set, wherein the unique readout time interval is not longer than a time need to integrate one frame;
transferring a first reset signal to the first set of pixels in the first row during a second time period within the unique readout time interval to reset pixels in the first set;
transmitting a second reset signal to a second set of pixels in a second row corresponding to a reset pointer during a third time period within the unique readout time interval to reset pixels in the second set; and
conveying a second select signal to the first set of pixels in the first row during a fourth time period within the unique readout time interval to readout respective reset values from pixels in the first set,
wherein the first time period, the second time period, the third time period, and the fourth time period are non-overlapping.

14. The method of claim 13, further comprising ordering transmission of signals within the unique readout time interval to cause the first select signal to be sent first, the first reset signal transferred second, the second reset signal transmitted third, and the second select signal conveyed fourth.

15. The method of claim 13, further comprising ordering transmission of signals within the unique readout time interval to cause the second reset signal to be transmitted first, the first select signal sent second, the first reset signal transferred third, and the second select signal conveyed fourth.

16. A method that facilitates staggering resets for sub-frame integration in a CMOS sensor imager, comprising:
sending a first select signal to a first set of pixels in a first row corresponding to a read pointer during a first time period within a unique readout time interval to read respective values from pixels in the first set, wherein the unique readout time interval is not longer than a time need to integrate one frame;

transferring a first reset signal to the first set of pixels in the first row during a second time period within the unique readout time interval to reset pixels in the first set;

transmitting a second reset signal to a second set of pixels in a second row corresponding to a reset pointer during a third time period within the unique readout time interval to reset pixels in the second set; and conveying a second select signal to the first set of pixels in the first row during a fourth time period within the unique readout time interval to readout respective reset values from pixels in the first set;

ordering transmission of signals within the unique readout time interval to cause the first select signal to be sent first, the first reset signal transferred second, the second reset signal transmitted third, and the second select signal conveyed fourth.

* * * * *